W. SOUTH.
Horse Hay-Rake.
No. 222,958. Patented Dec. 23, 1879.
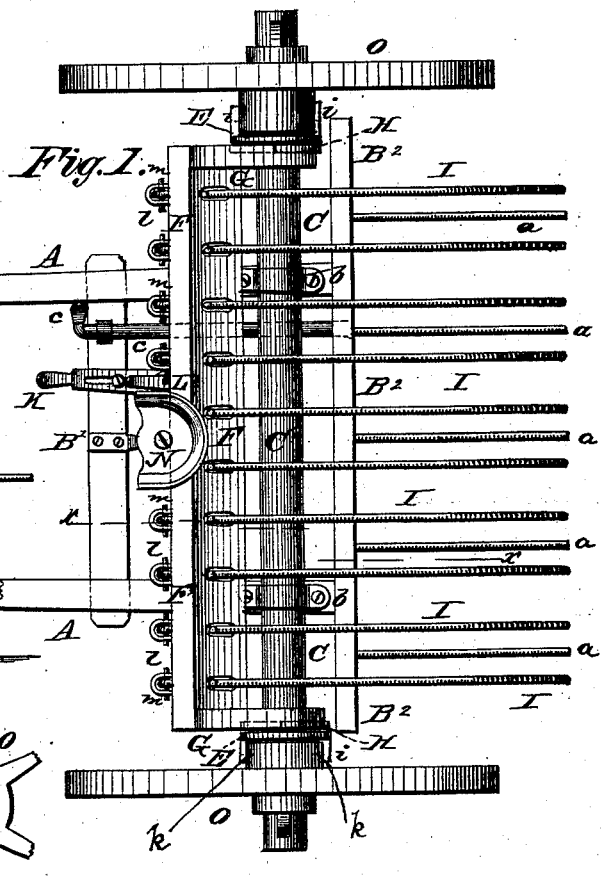
Fig. 1.
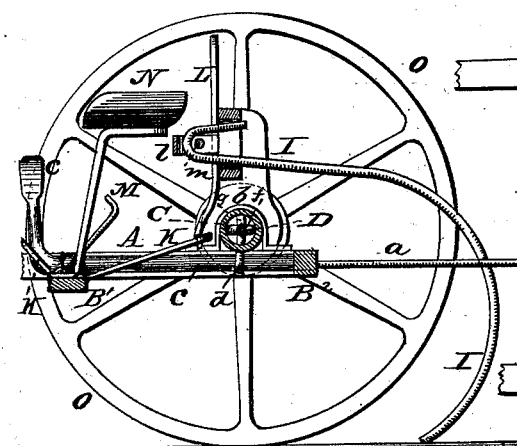
Fig. 2.
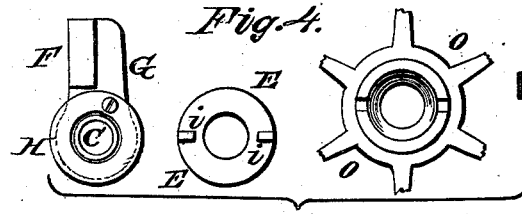
Fig. 4.
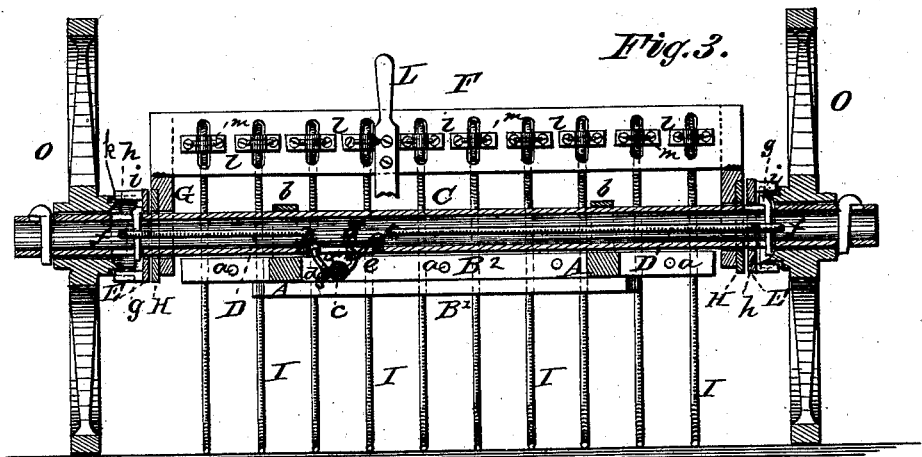
Fig. 3.
Fig. 5.
Witnesses:
P. L. Dieterich
Jno. A. Stockman
Inventor
William South
Per C. H. Watson & Co Attorneys.

UNITED STATES PATENT OFFICE.

WILLIAM SOUTH, OF HAGERSTOWN, MARYLAND, ASSIGNOR TO HIMSELF AND JOHN O. SMITH, OF SAME PLACE.

IMPROVEMENT IN HORSE HAY-RAKES.

Specification forming part of Letters Patent No. 222,958, dated December 23, 1879; application filed August 7, 1879.

*To all whom it may concern:*

Be it known that I, WILLIAM SOUTH, of Hagerstown, in the county of Washington and State of Maryland, have invented certain new and useful Improvements in Horse Hay-Rakes; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in horse hay-rakes; and it consists in the combination and arrangement of parts, as will be hereinafter more fully set forth.

In the annexed drawings, Figure 1 is a plan view. Fig. 2 is a section on line $x\ x$, Fig. 1. Fig. 3 is a front view, partly in section. Fig. 4 shows details; and Fig. 5 is a detail view, showing the connection of the lever and the rod.

A A represent the side bars, and $B^1$ $B^2$ the cross-bars, of the frame. To the cross-bar $B^2$ are attached the cleaners $a$.

Secured to the side bars, A, by means of straps $b$, is the axle C. Said axle is hollow, being made of gas-pipe or other suitable material.

D represents a rod passing through said axle, and operated by means of a rock-shaft, $c$. This rod D has attached to it links $x\ x$, which hook over a bar, $d$, passing through the rock-shaft $c$ and working in a slot, $e$, on the under side of the axle. The rock-shaft $c$ is attached to the bar B' by means of a strap, and is set into the bar $B^2$.

The said rod D is also provided with loops $f\ f$ at either end, through which are passed pins $g\ g$, working in slots $h\ h$ in the axle.

E E represent friction-plates, provided on their outer sides with lugs or projections $i$, adapted to engage in notches $k$ in the hubs of the wheels.

F represents the rake-head attached to the standards G, which are hung on the axle, and to which are attached the friction-plates H H.

I I represent the rake-teeth, made of the form shown, passing through the rake-head, and secured in the loops $l$ by means of pins $m$.

K represents a sliding hooked rod, adapted to be operated by the driver's foot, which is used to hold the rake down when desired. Said sliding hooked rod is provided at its forward end with a slot, which works on a pin passing up through said slot and attached to the bar B', and its rear end is attached to a lever, L, secured to the rake-head.

M is a hook, adapted to hold the rake up when desired.

N is a seat, attached to the bar B' in any suitable manner, and O O are the wheels.

The operation is as follows: The lugs $i$ on the friction-plates E are of such length as to admit of a certain lateral movement of said plates on the axle, while they are always in gear with the hubs of the driving-wheels, so as to be constantly rotated by them. The arm of the rock-shaft $c$, being pressed upon by the foot, draws the friction-plates E at each end of the axle against the plates H on the rake-head, which frictional contact causes the rake to be raised by the forward motion of the wheels to relieve itself of its load, and as soon as the foot is taken off the lever the rake drops back into position by its own gravity. The foot is then placed on the sliding hooked rod K, and the rake is held down until it is desired to be again raised.

It will also be observed that the manner of securing the rake-teeth to the head by means of the pins, as shown, provides a simple and cheap mode of attachment, and, should one of the teeth become displaced by the breaking of the pin, it could be readily and easily replaced.

Having thus fully described my invention, what I claim as new, and desire to secure by Letters Patent, is—

In a horse hay-rake, the hollow axle C, rod D, having links $x\ x$, rock-shaft $c$, having bar $d$, friction-plates E H, and pins $g\ g$, in combination with the wheels O O, standards G G, and rake, substantially as and for the purpose set forth.

In testimony that I claim the foregoing as my own I have hereunto affixed my signature in presence of two witnesses.

WILLIAM SOUTH.

Witnesses:
 S. S. DOWNIN,
 GEO. G. SOLLIDAY.